(12) United States Patent
Gallant (10) Patent No.: US 7,462,313 B2
(45) Date of Patent: Dec. 9, 2008

(54) SNAP CLOSURES

(75) Inventor: Christopher M. Gallant, Nottingham, NH (US)

(73) Assignee: Velcro Industries B.V., Curacao (AN)

( * ) Notice: Subject to any disclaimer, the term of this patent is extended or adjusted under 35 U.S.C. 154(b) by 86 days.

(21) Appl. No.: 11/248,088

(22) Filed: Oct. 12, 2005

(65) Prior Publication Data

US 2007/0079481 A1     Apr. 12, 2007

(51) Int. Cl.
    *B29C 39/14* (2006.01)
(52) U.S. Cl. ............... 264/167; 264/157; 264/310
(58) Field of Classification Search ........... 264/167, 264/157
    See application file for complete search history.

(56) References Cited

U.S. PATENT DOCUMENTS

| | | | |
|---|---|---|---|
| 1,536,105 A | 5/1925 | Kaye | |
| 2,080,402 A | 5/1937 | Herman | |
| 2,421,067 A | 5/1947 | Howe | |
| 2,899,347 A | 8/1959 | Kindseth | |
| 3,372,442 A | 3/1968 | Ishimatsu | |
| 3,762,000 A * | 10/1973 | Menzin et al. | 24/452 |
| 3,823,516 A | 7/1974 | Christian | |
| 4,794,028 A | 12/1988 | Fischer | |
| 5,005,242 A | 4/1991 | Kennedy et al. | |
| 5,260,015 A | 11/1993 | Kennedy et al. | |
| 5,400,568 A | 3/1995 | Kanemitsu et al. | |
| 5,447,772 A | 9/1995 | Flieger | |
| 5,518,795 A | 5/1996 | Kennedy et al. | |
| 5,744,080 A | 4/1998 | Kennedy et al. | |
| 5,774,954 A | 7/1998 | Ramsey et al. | |
| 5,924,797 A | 7/1999 | Netto | |
| 5,934,806 A | 8/1999 | Tomic et al. | |
| 6,127,018 A | 10/2000 | Akeno et al. | |
| 6,162,040 A | 12/2000 | Clune | |
| 6,248,149 B1 | 6/2001 | Massey et al. | |
| 6,280,670 B1 | 8/2001 | Buzzell et al. | |
| 6,737,147 B2 | 5/2004 | Kennedy et al. | |
| 6,851,161 B2 | 2/2005 | Kingsford et al. | |
| 2003/0061692 A1 | 4/2003 | Kingsford et al. | |
| 2003/0190451 A1 | 10/2003 | Baker et al. | |
| 2005/0098454 A1 | 5/2005 | Gallant et al. | |
| 2005/0170157 A1 | 8/2005 | Armela et al. | |
| 2005/0183248 A1 | 8/2005 | Gallant et al. | |
| 2005/0186387 A1 | 8/2005 | Gallant et al. | |

FOREIGN PATENT DOCUMENTS

| | | |
|---|---|---|
| DE | 19906008 | 8/2000 |
| EP | 1304213 | 4/2003 |
| WO | WO 97/31605 | 9/1997 |
| WO | WO 2005/072938 | 8/2005 |
| WO | WO 2005/082197 | 9/2005 |

* cited by examiner

*Primary Examiner*—Monca A Huson
(74) *Attorney, Agent, or Firm*—Fish & Richardson P.C.

(57) ABSTRACT

A method of forming snap closures includes molding a series of discrete male and female snaps extending integrally from a base.

15 Claims, 6 Drawing Sheets

SNAP CLOSURES

TECHNICAL FIELD

This invention relates to snap closures and methods of making snap closures.

BACKGROUND

Snap closures can be used to securely close various articles, such as clothing and bags. Generally, snap closures include a male snap and a female snap. The male snap can be inserted into the female snap such that it becomes releasably retained therein. In order to release engagement of the male and female snaps, the user can generally pull the snaps away from one another to temporarily deform one or both of the male and female snaps. As a result, users can releasably close articles having the snap closures attached thereto.

SUMMARY

In one aspect of the invention, a method of forming snap closures includes introducing moldable resin into a gap defined adjacent a rotatable mold roll defining snap-forming cavities in its peripheral surface. Each cavity defines an undercut. The resin is pressed into the cavities to mold a series of discrete, spaced-apart male snaps. Each male snap has at least one molded feature corresponding to at least one of the cavities in the mold roll. A remainder of the resin remains on the peripheral surface of the mold roll and forms at least part of a longitudinal base from which the male snaps extend. A series of female snaps on the base is molded from the resin. Each female snap has a plurality of molded features, and each female snap is aligned with one of the male snaps and sized to releasably retain its associated male snap. The base and molded male snaps are stripped from the mold roll. The molded features of each male snap overhang the base on multiple sides outside the male snap, and the molded features of each female snap overhang the base on multiple sides within the female snap. The base is separated to form multiple snap closures, each closure including at least one male snap and at least one associated female snap.

In another aspect of the invention, a preform snap closure sheet includes a continuous sheet-form base and multiple male and female snaps integrally molded with the continuous sheet-form base. The snaps are arranged along the sheet-form base in a longitudinally repeating pattern. Each male snap has at least one molded feature, and each female snap has multiple molded features. Each female snap is aligned with one of the male snaps and is sized to releasably retain its associated male snap. The molded feature of each male snap overhangs the base on multiple sides outside the male snap, and the molded features of each female snap overhang the base on multiple sides within the female snap. The sheet-form base includes frangible parting lines extending transversely across the sheet-form base between multiple regions. Each region defines a discrete snap closure including at least one of the male snaps and at least one of the female snaps.

In a further aspect of the invention, a snap closure includes a sheet-form base and at least one male snap and at least one female snap integrally molded with the sheet-form base. Each male snap has at least one molded feature, and each female snap has multiple molded features. Each female snap is aligned with one of the male snaps and sized to releasably retain its associated male snap. The molded feature of each male snap overhangs the base on multiple sides outside the male snap, and the molded features of each female snap overhang the base on multiple sides within the female snap.

Embodiments can include one or more of the following features.

In some embodiments, the snap-forming cavities are arranged in associated groups of at least three cavities forming a segmented ring, and each male snap has at least three molded features forming a segmented ring.

In certain embodiments, each female snap has at least three molded features forming a segmented ring.

In some embodiments, each female snap includes two opposed molded features.

In certain embodiments, at least some of the opposed molded features partially form two adjacent female snaps.

In some embodiments, each female snap further includes two additional opposed molded features, the molded features defining a substantially enclosed central region therebetween.

In certain embodiments, at least some of the snap-forming cavities used to form the molding features of the male snaps are substantially identical to at least some cavities used to form the molding features of the female snaps.

In some embodiments, the female snaps are molded in associated cavities defined within the peripheral surface of the mold roll.

In certain embodiments, the female snaps are molded in associated cavities defined within the peripheral surface of a counter-rotating pressure roll that, together with the mold roll, defines the gap into which the resin is introduced.

In some embodiments, the base, as molded, carries a longitudinal row of male snaps and a longitudinal row of corresponding female snaps, with a flexible web therebetween.

In certain embodiments, the method further includes introducing a pre-formed material to the gap with the resin to become an integral part of the flexible web between the male and female snaps.

In some embodiments, along each row, the base connecting adjacent snaps includes the pre-formed material.

In certain embodiments, along each row, resin of the base is longitudinally continuous.

In some embodiments, the method further includes, after stripping the base from the mold roll, cross-linking resin of at least some of the snaps to increase molded feature rigidity.

In certain embodiments, both the male and female snaps are cross-linked.

In some embodiments, each male snap essentially consists of three to five molded features together comprising between about 60 and about 80 percent of a circumference of their associated ring, such that breaks between the molded features together include between about 20 and about 40 percent of the circumference of their associated ring.

In certain embodiments, each male snap essentially consists of four molded features, each molded feature extending between about 18 and about 36 degrees of its associated ring.

In some embodiments, the longitudinal base is separated by severing the base across its width.

In certain embodiments, the method further includes forming a frangible region in the base between associated male and female snaps.

In some embodiments, each male snap has at least three molded features forming a segmented ring.

In certain embodiments, at least some of the male and female snaps are aligned with one another in a transverse direction of the sheet-form base.

In some embodiments, the sheet-form base includes a frangible region extending longitudinally about the base between the male and female snaps.

In certain embodiments, the molded features of each male and female snap overhang the base at an angle of about 50 degrees to about 85 degrees relative to the sheet-form base.

In some embodiments, the angle of the molded features of the male snap relative to the base is substantially equal to the angle of the molded features of the female snap relative to the base.

In certain embodiments, an average outer diameter of the male snaps is greater than an average inner diameter of the female snaps.

In some embodiments, snap closures can be formed using continuous molding techniques. Continuous molding techniques can result in greater production and greater efficiency than traditional molding techniques, such as injection molding. Consequently, the manufacturing processes described herein can enable the production of relatively inexpensive snap closures.

Other aspects, features, and advantages will be apparent from the description, the drawings, and the claims.

DESCRIPTION OF DRAWINGS

Like reference symbols in the various drawings indicate like elements.

DETAILED DESCRIPTION

Methods described herein can be used to continuously form snap closures. In general, the methods include forming a continuous snap closure sheet that includes multiple, longitudinally spaced apart male and female snaps extending from a resin base. Pairs of the male and female snaps are aligned with one another about the base of the closure. The snap closure sheet is then separated into multiple snap closures, each of which includes one or more pairs of the male and female snaps. The snap closure can be attached to any of various articles, such as bags and clothing, to allow the articles to be releasably closed by a user.

Figure 1:
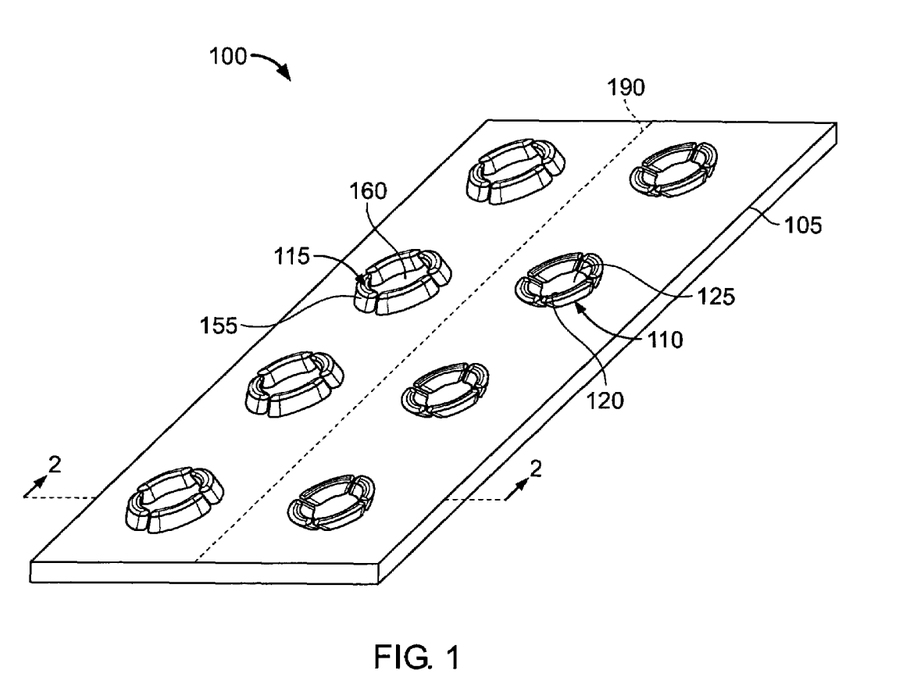
FIG. 1 is a perspective view of an embodiment of a snap closure.

Referring to FIG. 1, a snap closure 100 includes a resin base 105, multiple male snaps 110, and multiple female snaps 115. The resin base 105 has a thickness of about 0.005 inch to about 0.030 inch. The male and female snaps 110, 115 extend integrally from the resin base to a height of about 0.020 inch to about 0.100 inch above the base 105. As used herein, the term "snap" refers to a closure feature that is capable of retaining or being retained by a corresponding closure feature. The term "snap," as used herein, is not limited solely to closure features that operate with a snapping sound.

The male snaps 110 include four arcuate molded features 120 that extend integrally from the base 105 and overhang the base 105. The molded features 120 are arranged in a substantially circular pattern about the perimeter of a central region 125. The molded features 120 are circumferentially spaced apart from one another such that the male snap 110 is in the form of a segmented ring. The molded features 120 can together extend around about 60 percent to about 80 percent of the circumference of the ring. The breaks that circumferentially separate the molded features 120 can together account for about 20 percent to about 40 percent of the circumference of the ring. Each of the four molded features 120 can, for example, extend from about 18 to about 36 degrees around the circumference of the segmented ring.

The female snaps 115 similarly include four arcuate molded features 155 that extend integrally from the resin base 105 and overhang the base 105. The molded features 155 are arranged in a substantially circular pattern about a central region 160. Like the molded features 120 of the male snaps 110, neighboring molded features of the female snaps 115 can be circumferentially spaced apart from one another such that each of the female snaps 115 is in the form of a segmented ring. The molded features 155 can together extend around about 60 percent to about 80 percent of the circumference of the ring. The breaks that circumferentially separate the molded features 155 can together account for about 20 percent to about 40 percent of the circumference of the ring. Each of the four molded features 155 can, for example, extend from about 18 to about 36 degrees around the circumference of the segmented ring.

Figure 2:
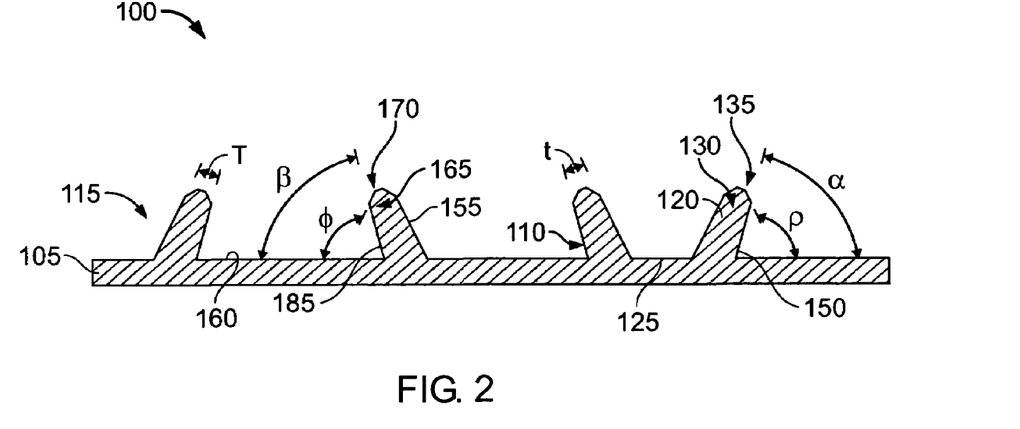
FIG. 2 is a cross-sectional view of the snap closure of FIG. 1 taken along line 2-2.

As shown in FIG. 2, the molded features 120 of the male snaps 110 extend outwardly (e.g., away from the central region 125) from the resin base 105 to a tip region 130. Under edges 150 of the molded features 120 extend outwardly away from the central region 125 at an angle $\alpha$ about 50 degrees to about 85 degrees (e.g., about 60 degrees to about 75 degrees) relative to the resin base 105. The tip region 130 of the molded features 120 includes a camming surface 135 that extends at an angle $\rho$ of about 95 degrees to about 125 degrees (e.g., about 105 degrees to about 115 degrees) relative to the surface of the resin base 105 from which the molded features 120 extend. The molded features 120 of the male snaps 110 can have a thickness t of about 0.030 inch to about 0.100 inch (e.g., about 0.050 inch to about 0.070 inch). In some embodiments, the molded features 120 decrease in thickness from the resin base 105 to the tip region 130.

Still referring to FIG. 2, the molded features 155 of the female snaps 115 extend inwardly (e.g., toward or into the central region 160) from the resin base 105 to a tip region 165. Under edges 185 of the molded features 155 extend inwardly toward or into the central region 165 at an angle $\beta$ of about 50 degrees to about 85 degrees (e.g., about 60 degrees to about 75 degrees) relative to the resin base 105. The tip region 165 includes a camming surface 170 that extends at an angle $\phi$ of about 95 degrees to about 125 degrees (e.g., about 105 degrees to about 115 degrees) relative to the resin base 105. The molded features 155 of the female snaps 115 can have a thickness T of about 0.030 inch to about 0.100 inch (e.g., about 0.050 inch to about 0.070 inch). In some embodiments, the molded features 155 decrease in thickness from the base 105 to the tip region 165.

Referring again to FIG. 1, the male and female snaps 110, 115 are arranged in a longitudinally spaced-apart fashion along the length of opposite side regions of the snap closure 100. The male snaps 110 and the female snaps 115 are substantially transversely aligned with one another about the resin base 105. The resin base 105 includes a frangible tear line 190 extending along the length of the resin base 105 between the rows of male and female snaps 110, 115. The frangible tear line 190 can, for example, include perforations or score regions in the resin base 105. During use, the base 105 can be separated along the tear line 190 resulting in a male portion and female portion, for example. Alternatively or additionally, the frangible tear line 190 can include a string or filament disposed within the resin base 105 that can be pulled to tear the resin base 105 into two separate pieces. For example, one piece can include the male snaps 110 and the other piece can include the female snaps 115. As described below, the male snaps 110 can be inserted into the central regions 160 of the female snaps 115 to releasably secure the male portion of the snap closure 100 to the female portion of the snap closure 100. Consequently, the snap closure 100 can be used to releasably secure various articles, such as bags and clothing, in a closed position.

Figure 3:
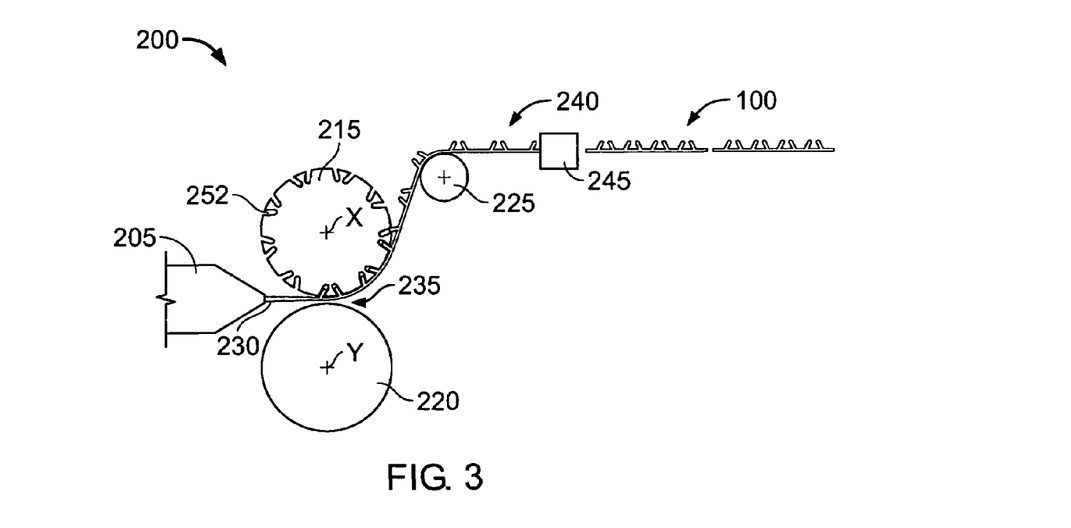
FIG. 3 illustrates an embodiment of a method and apparatus for forming snap closures.

FIG. 3 illustrates a method and apparatus 200 for making the above-described snap closures 100. The apparatus 200 includes an extruder 205, a mold roll 215, a counter-rotating pressure roll 220, a stripping roll 225, and a separating device 245. The extruder 205 extrudes a sheet of resin 230 into a pressure nip 235 formed between the peripheral surfaces of the mold roll 215 and the pressure roll 220. Some of the resin is pressed into molding cavities 250, 252 (shown in FIG. 4) defined by the mold roll 215. The resin 230 is then conveyed around the mold roll 215 toward the stripping roll 225. The stripping roll 225 strips the resin 230 from the mold roll 225 to expose a continuous snap closure sheet 240. The snap closure sheet 240 is then conveyed through a separating device 245 where it is separated into multiple, discrete snap closures 100.

The extruder 205, as noted above, extrudes a sheet of molten resin 230 into the pressure nip 235. A die can be attached to an outlet of the extruder 205 to affect the manner in which the resin is extruded. The die, for example, can include a continuous slot that allows the resin to be extruded in a continuous sheet. The size of the continuous slot can determine the size of the snap closure 100 that is formed. Alternatively, the die can include multiple discrete slots in order to introduce multiple, discrete lanes of resin into the pressure nip.

The molten resin 230 can include any of various materials capable of being molded and retaining the molded shape. For example, the molten resin 230 can include any of various thermoplastic materials, such as polypropylene, polyethylene, and/or polyamides. Furthermore, differing materials can be introduced into different areas of the nip 235 depending on the desired snap closure characteristics. For example, to produce a closure having a snap and a base that embody different physical characteristics (e.g., different rigidity, different hardness, different stiffness), different materials can be introduced to the corresponding regions of the mold roll responsible for forming the snaps and the base. Similarly, different types of materials can be used to form the male snaps 110 and the female snaps 115.

Figure 4:
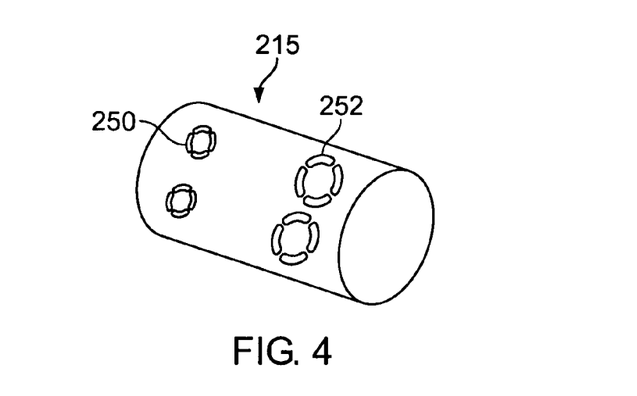
FIG. 4 is a perspective view of a mold roll defining multiple molding cavities used to mold snaps.

Referring to FIG. 4, the mold roll 215 defines multiple molding cavities 250 for forming the male snaps 120 and multiple molding cavities 252 for forming the female snaps 155. The molding cavities 250, 252 are circumferentially positioned about transversely opposed regions of the mold roll 215. The molding cavities 250 have surfaces to which the surfaces of the above-described molded features 120 conform. Similarly, the molding cavities 252 have surfaces to which the surfaces of the above-described molded features 155 conform. Each of the molding cavities 250, 252, for example, includes an undercut surface to form portions of the male and molded features 120, 155 that overhang the base 105.

Referring again to FIG. 3, when the resin 230 is introduced into the molding cavities 250 and allowed to cool, the male snaps 110 are formed. When the resin 230 is introduced into molding cavities 252 and allowed to cool, the female snaps 115 are formed. The molding cavities 250, 252 are transversely aligned and circumferentially spaced apart along the surface of the mold roll 215 in order to form the snaps 110, 115, which are transversely aligned and longitudinally spaced apart about the snap closure sheet 240.

As shown in FIG. 3, the pressure roll 220 has a substantially smooth peripheral surface (i.e., no protrusions or cavities). The mold roll 215 and pressure roll 220 are positioned adjacent one another with their axes of rotation X, Y substantially aligned. As a result of the rotation and alignment of the rolls 215, 220, a large amount of pressure is created in the pressure nip 235. When the resin 230 is introduced into the pressure nip 235 the pressure forces some of the resin 230 into the molding cavities 250, 252, as discussed above, to form the snaps 110, 115. The remainder of the resin 230 is compressed between the peripheral surfaces of the mold roll 215 and the pressure roll 220 to form the resin base 105. As noted above, the resin base 105 interconnects each of the snaps 110, 115 in this embodiment (i.e., each of the snaps extends from the common resin base).

The thickness of the base 105 depends in part on the separation distance between the peripheral surface of the mold roll 215 and the pressure roll 220. Typically, the thickness of the base 105 increases as the separation distance between the mold roll 215 and pressure roll 220 increases. Thus, the arrangement of the mold roll 215 and pressure roll 220 relative to one another can depend on the desired thickness of the resin base 105. The distance between the peripheral surfaces of the mold roll 215 and the pressure roll 220, for example, can be about 0.005 inch to about 0.03 inch.

The stripping roll 225 is configured to rotate in a manner that strips the resin snaps 110, 115 from the molding cavities 250, 252. At the same time, the stripping roll 225 removes the resin base 105 from the peripheral surface of the mold roll 215. By doing so, the stripping roll 225 exposes the continuous snap closure sheet 240. The rotation of the stripping roll 225 also helps to convey the continuous snap closure sheet 240 toward the separating device 245.

Figure 5:
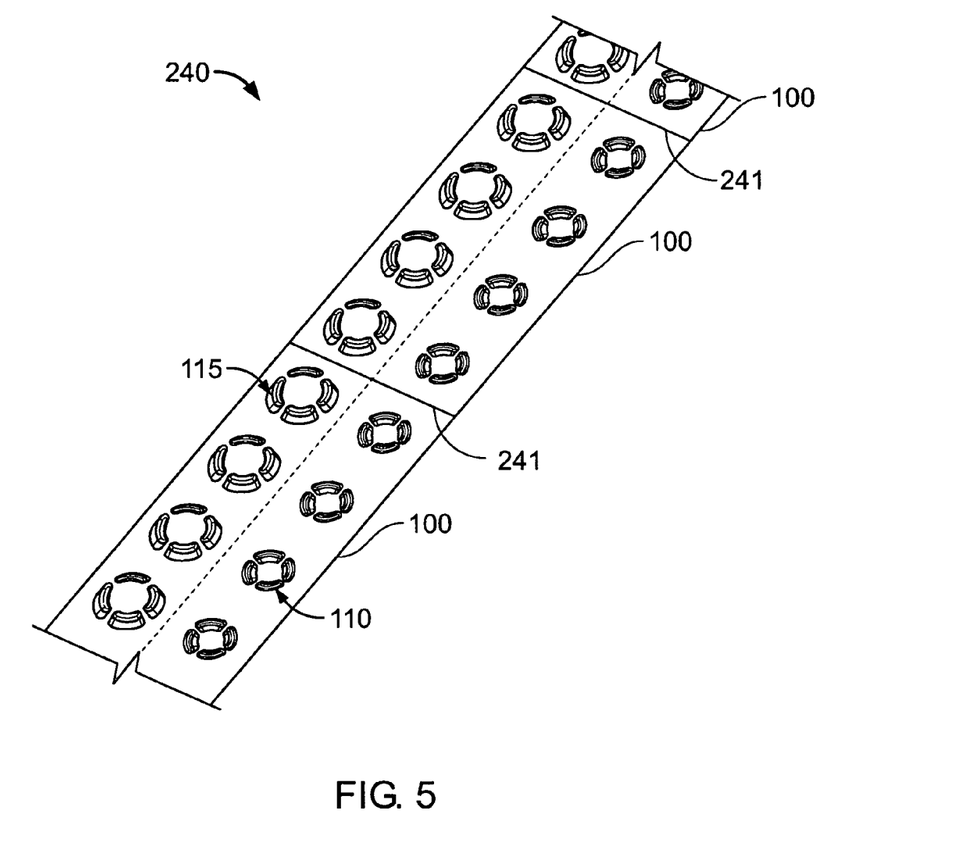
FIG. 5 is a partial perspective view of an embodiment of a snap closure sheet including multiple integral snap closures.

Referring to FIG. 5, the continuous snap closure sheet 240 includes a longitudinal row of the female snaps 115 and a longitudinal row of the male snaps 110. The snaps 110, 115 are longitudinally spaced apart along the snap closure sheet 240. Although the sheet 240 can be a substantially unitary sheet of material, predetermined boundary lines 241 have been included in order to demarcate the regions where the separating device 245 (shown in FIGS. 3 and 6) can separate the sheet 240 into multiple, discrete snap closures 100 (shown in FIG. 1).

Figure 6:
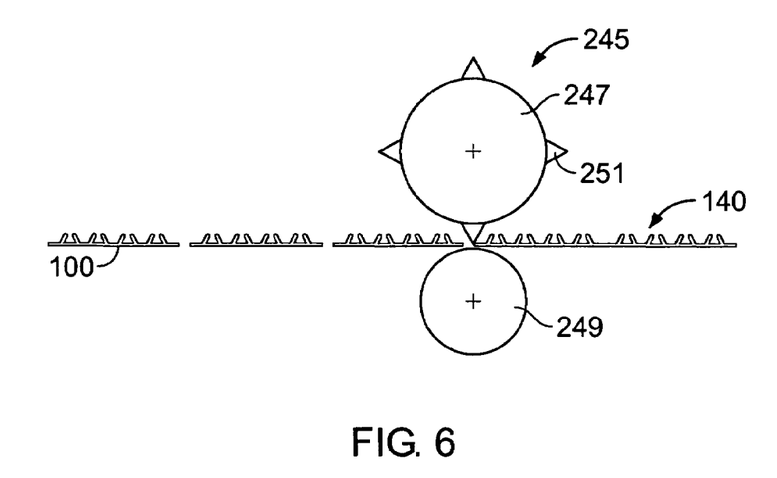
FIG. 6 is a side view of an embodiment of a separating device used to separate a snap closure sheet into multiple, discrete snap closures.

Referring to FIGS. 3 and 6, the separating device 245 includes a cutting roll 247 positioned adjacent a support roll 249. The cutting roll 247 includes multiple cutting projections 251 extending from its peripheral surface. As the snap closure sheet 240 is conveyed between the cutting roll 247 and the support roll 249, the cutting projections 251 cut the sheet 240 along the predetermined boundary lines 241 (shown in FIG. 5) to separate the snap closure sheet 240 into multiple, discrete snap closures. In some embodiments, the cutting projections 251 extend across the entire width of the fastener closure sheet 240 to completely detach adjacent fastener closures from one another. The support roll 249 provides a support surface for the sheet 240 as the projections 251 are pressed into the sheet 240. The support roll 249 can also be configured to help convey the sheet 240. For example, the support roll 249 can be rotated, such that it conveys the sheet through the separating device 245.

Various suitable means can be used to help to ensure that the snap closure sheet 240 is cut along the predetermined boundary lines 241, rather than in other regions of the sheet. For example, the cutting roll 247 can include multiple cavities that mate with the snaps 110, 115 of the snap closure sheet 240. The cutting roll 247 can be configured such that it includes no independent means of rotation. In some embodiments, for example, the roll 247 relies on the conveyed sheet 240 to cause it to rotate as the conveyed snaps 110, 115 enter the cavities of the roll 247. The cutting projections 251 can be separated along the peripheral surface of the roll by a distance equal to the desired width of the discrete snap closures. Thus, as the cutting roll 247 rotates, it cuts the sheet 240 into multiple discrete snap closures having a predetermined width.

Figure 7:
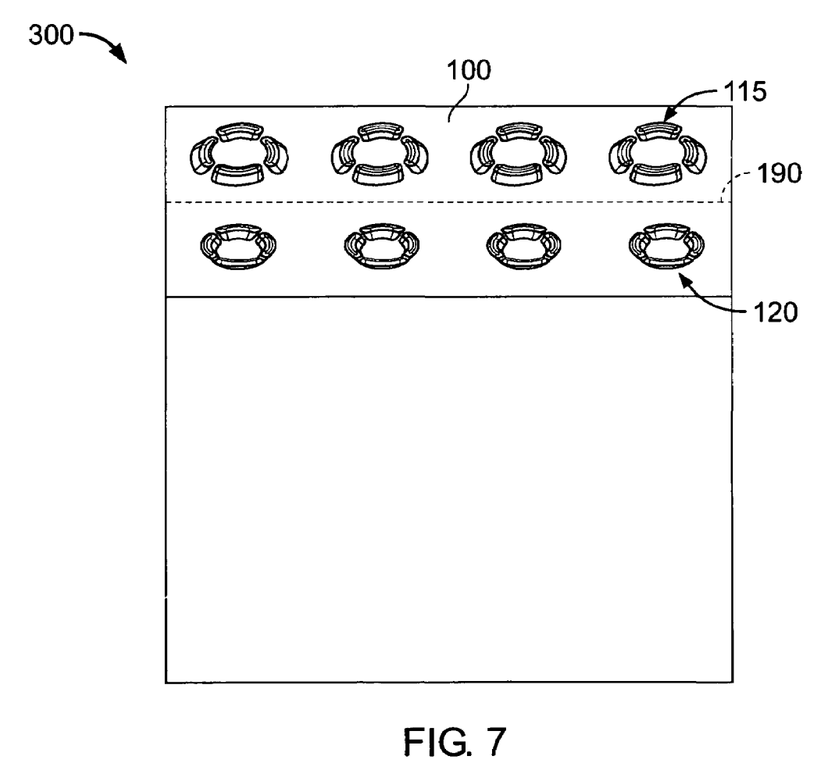
FIG. 7 is a perspective view of a bag enclosed by the snap closure of FIG. 1.

FIG. 7 illustrates the snap closure 100 attached to a bag 300. The snap closure 100 is configured to close an opening of the bag. For example, a lower region of the snap closure 100 can be attached to a face of the bag, and an upper region of the snap closure 100 can be attached to an opposite wall of the bag extending above the face. The snap closure 100 can be attached to the bag 300 using any of various techniques. For example, the snap closure 100 can be welded to the bag or adhesively attached to the bag. In some embodiments, the bag 300 and the snap closure 100 are formed of compatible materials, such that the snap closure 100 can be welded directly to the bag 50 (e.g., without the use of intermediary materials).

Figure 8:
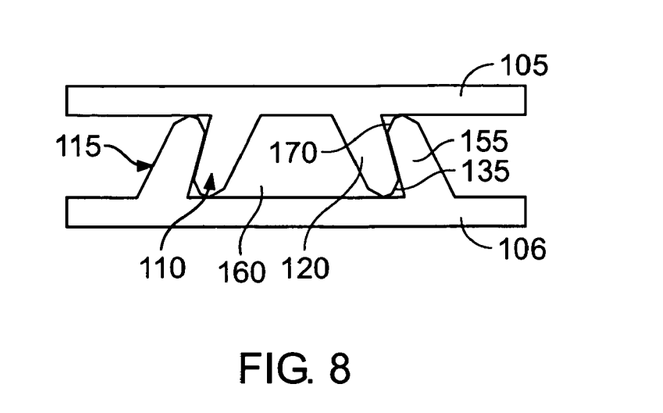
FIG. 8 is a cross-sectional view of the snap closure of FIG. 1 in an engaged state.

During use of the bag 300, the upper and lower portions of the snap closure 100 can be detached from one another along the frangible line 190 to provide an opening to the bag 300. Once the bag 300 has been opened, the snap closure 100 can be used to releasably reclose the bag 300. For example, the upper portion of the snap closure 100 can be folded over onto the lower portion of the snap closure 100, such that the male and female snaps 110, 115 are substantially aligned with one another. Pressure can then be applied to the snap closure 100 to insert the male snaps 110 into the central cavities defined by the female snaps 115, as shown in FIG. 8. When pressing the male snaps 110 into the central recesses of the female snaps 115, the camming surfaces 135, 170 of the molded features 120, 155 contact one another causing the molded features 120 of the male snaps 110 to deflect inward (e.g., toward the central region 125) and/or the molded features 155 of the female snaps 115 to deflect outward (e.g., away from the central region 160). Consequently, the male snaps 110 can slide into the central recesses 160 of the female snaps 115.

Once the male snaps 110 are positioned within the central recesses 160 of the female snaps 115, the molded features 120, 155 can flex back toward their original positions such that the under surfaces 150, 185 of the molded features 120, 155 securely engage one another. Due to the geometry of the snaps 110, 115, the male snaps 110 can be substantially retained within the central cavities of the female snaps 115. For example, the inclination angle of the under edge 150 of the molded features 120 relative to the base 105 can be substantially equal to the inclination angle of the under edge 185 of the molded features 155 relative to the base 105. Consequently, the male snaps 110 cannot be withdrawn from the central recesses of the female snaps 115 without first deforming the molded features of the male and/or female snaps 110, 115.

To reopen the bag 300, the snaps 110, 115 can be uncoupled from one another by applying an opposing force great enough to deflect the molded features 120 inward and/or the molded features 155 outward such that the male snaps 110 can be removed from the central recess of the female snaps 115.

While many embodiments have been described above, other embodiments are possible.

For example, while the outer diameter of the male snaps 110 along the length of the molded features 120 (e.g., the average diameter of the male snaps 110) has been described as being substantially equal to the inner diameter of the female snaps 115 along the length of the molded features 155 (e.g., the average diameter of the female snaps 115), in some embodiments, the average outer diameter of the male snaps 110 is slightly greater (e.g., about 0.001 inch greater) than the average inner diameter of the female snaps 115. Due to the slight disparity in diameters, the male snaps 110 can, in some cases, be held more securely within the central portions of the female snaps 115.

While the snaps 110, 115 described above include four molded features 120, 155, the snaps can alternatively include more or less than four molded features. For example, each of the snaps can include 1, 2, 3, 5, 6, or more molded features.

While the molded features 120, 155 of the embodiments described above are arranged in a substantially circular or ring pattern, the molded features can alternatively be arranged in other patterns. For example, the molded features can be arranged in a rectangular pattern, a square pattern, a pentagonal pattern, a hexagonal pattern, an octagonal pattern, or any of various other patterns.

Figure 12:
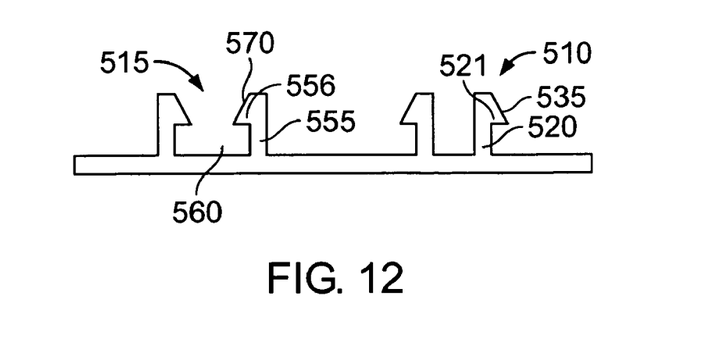
FIG. 12 is a cross-sectional view of an embodiment of a snap closure including molded features with annular projections.

While the molded features 120, 155 of the above embodiments have substantially uniform cross-sections, the molded features in other embodiments include projections extending therefrom. Referring to FIG. 12, for example, molded features 520, 555 include annular projections 521, 556 near their distal end regions. The annular projections 521, 556 include camming surfaces 535, 570. Upon aligning the male snap 510 with the female snap 515, the camming surfaces 535, 570 contact one another. As the user applies pressure to the male snap 510 and/or the female snap 515, the molded features 520, 555 deflect allowing the female snap 515 to receive the male snap 510 within a central recess 560 defined by the female snap 515. Once the male snap 510 is positioned within the female snap 515, the annular projections 521, 556 can abut one another to securely retain the male snap 510 within the female snap 515.

While the snap closures of some of the embodiments above are described as being attached to a bag, the snap closures can alternatively be attached to various other closures. For example, the snap closures can be attached to various articles of clothing, such as coats, jackets, shirts, pants, etc. Consequently, the snap closure can be used to hold various other articles in a desired form.

While the snap closures described above include both male and female snaps, the snap features can alternatively include only male or only female snaps. For example, the snap closures can include separate snap strips (e.g., one with male snaps and the other with female snaps). For example, one of the snap strips can be attached to an inner surface of a bag near the bag opening and the other snap strip can be attached to the opposing inner surface of the bag. The snap strips can alternatively or additionally be attached to joinable portions of clothing, for example.

While the snap closure sheet 140 is described above as having one lane of male snaps and one lane of female snaps, other embodiments are contemplated. For example, the snap closure sheet may be formed to include multiple, alternating rows of male and female snaps. In order to form the male and female snaps in such embodiments, the mold roll may include multiple circumferentially extending regions that define cavities shaped and arranged to form the male and female snaps. In such embodiments, the snap closure sheet may be longitudinally cut in one or more regions between the snaps to provide multiple sheets that include one lane of male snaps and one lane of female snaps. Using such a technique can enable the closure of snaps at an increased rate relative to the techniques described above.

While the die of the extruder 205 described above includes a single slot, the die can alternatively include multiple discrete slots causing the resin to be extruded in multiple discrete lanes. The multiple lanes of resin, for example, can be extruded onto a pre-formed material (e.g., fabric) that is conveyed between the mold roll and pressure roll. The resin can be extruded onto transversely separated regions of the fabric to form separated lanes of male and female snaps, for example. In such embodiments, the pre-formed material can provide a flexible region between longitudinally extending rows of snaps. In certain embodiments, the pre-formed material provides a backing on the closure.

While the pressure roll 220 described in the embodiments above includes a flat peripheral surface, the pressure roll can alternatively include protrusions to facilitate conveyance of the resin 230 and/or the fabric through the pressure nip 235 (i.e., the region between adjacent peripheral surfaces of the rolls).

While the molding cavities 250, 252 of the embodiments described above are defined by the mold roll 215, the molding cavities can alternatively or additionally be defined by the pressure roll 220. As a result, snap closures can be produced that include snaps 110, 115 extending from one or both sides of the base 105. Alternatively, snap closures can be produced having one of the male snaps 110 and the female snaps 115 extending from one surface and the other extending from the opposite surface.

In certain embodiments, the cutting roll 247 can be positioned adjacent the stripping roll such that the stripping roll additionally functions as the support roll.

Alternative or additional means for ensuring that the cutting roll 247 cuts the snap closure sheet along the predetermined regions are also contemplated. For example, the mold roll and/or the pressure roll can be configured to mold alignment features along an outer edge or edges of the snap sheet. The alignment features can be arranged to mate with apertures or cavities in the cutting roll 247 to both convey and align the sheet relative to the cutting roll. Because the alignment features are not generally desired features of the molded snap closures, they can be removed from the sheet after or while the sheet is conveyed through the cutting roll. For example, the sheet can be conveyed through a cutting device, such as a knife, that cuts off the edge or edges of the sheet. For more detail regarding this process, the reader is referred to U.S. Pat. No. 6,280,670, the entire contents of which are incorporated herein by reference.

While the separating device 245 described above includes a roller 247 with cutting elements 251 extending therefrom, various other types of separating devices can be used. For example, the separating device can include one or more knives. The knives of the separating device can intermittently cut through the sheet as the sheet is conveyed through the separating device to produce discrete snap closures. The rate at which the knives cut is dependent upon the desired width (or length) of the discrete snap closures and the rate at which the sheet is conveyed. As another alternative, the sheet can be conveyed through a punch press device. The punch press device can be adapted to cut one or more closures in a single pressing action. As with the knives discussed above, the rate at which the punch press is activated is dependent upon desired size of the discrete snap closures and the rate of speed at which the sheet is conveyed.

While the separating device of the above-described embodiment detaches adjacent snap closures from one another, the separating device need not completely detach adjacent snap closures of the snap closure sheet from one another in other embodiments. For example, the snap closures can be separated from one another only by periodic perforations or score marks. In such cases, the snap closures can be completely detached from the snap closure sheet 240 by a user at a later time (e.g., after the manufacturing process described herein). After being perforated or scored, for example, the sheet 240 can be spooled onto a roll for shipping or storage. The perforated sheet can be separated by hand into multiple discrete snap closures.

In some embodiments, the resin of at least some of the snaps is cross-linked to increase the rigidity of the snaps (e.g., the rigidity of the molded features of the snaps).

Figure 9:
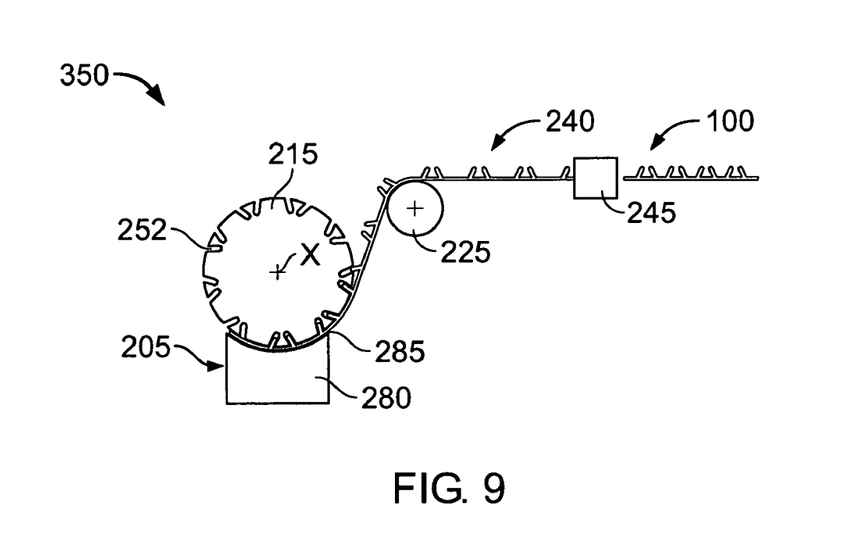
FIG. 9 illustrates another embodiment of a method and apparatus for forming snap closures.

Other methods and apparatus of making snap closures can also be used. For example, FIG. 9 illustrates a method and apparatus 350 that is similar to the methods and apparatus described above. The extruder 205 shown in FIG. 9, however, includes an arcuate housing 280 positioned adjacent the mold roll 215 to define a gap 285 between the housing 280 and the peripheral surface of the mold roll 215. The extruder 205 extrudes resin into the gap 285. Due to the configuration of the extruder housing 280 relative to the mold roll 215, a large amount of pressure is developed within the gap 285. Consequently, the resin is pressed into the molding cavities 250, 252 of the mold roll 215 to form the snaps 110, 115. The remainder of the process may be similar to the processes described above to form a snap closure that is similar to the snap closures described above.

Figure 10:
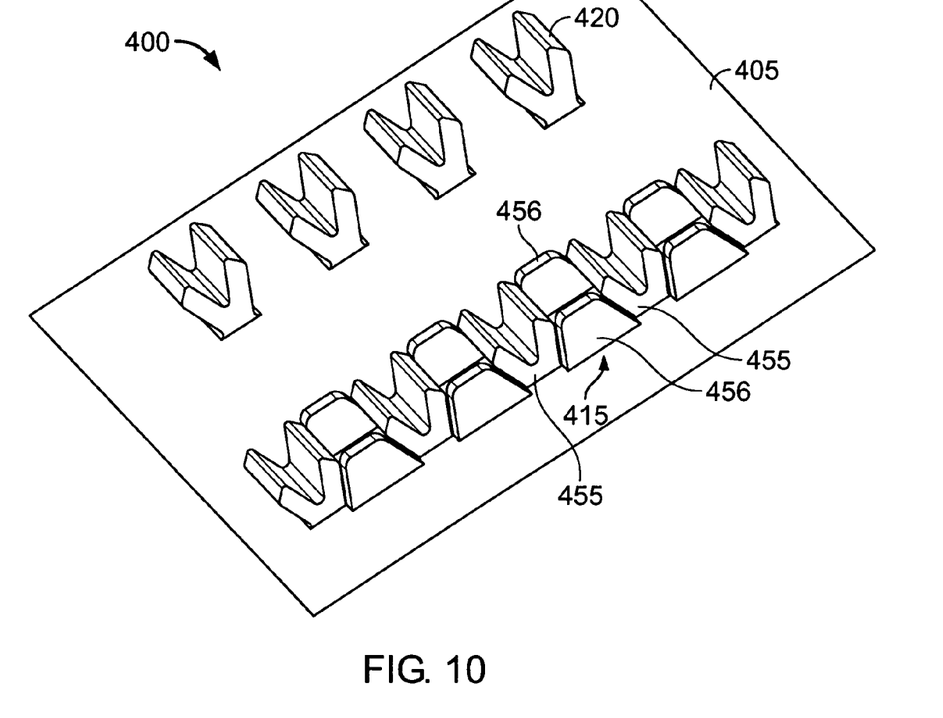
FIG. 10 is a perspective view of another embodiment of a snap closure.
Figure 11:
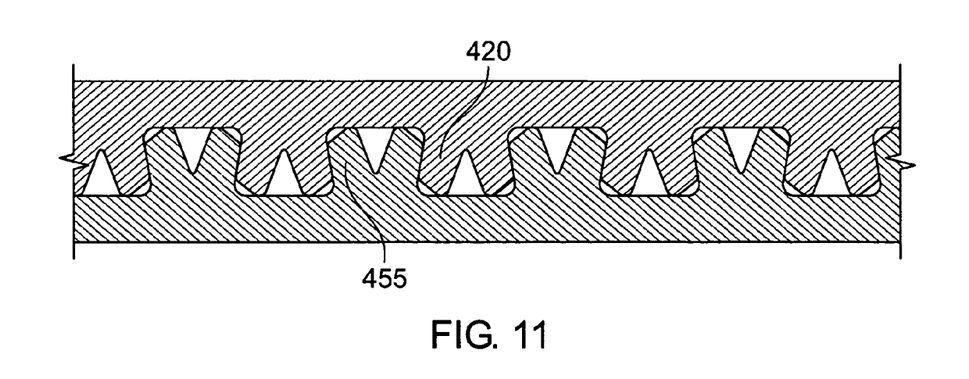
FIG. 11 is a cross-sectional view of the snap closure of FIG. 10 in an engaged state.

Other types of snap closures can be formed using methods similar to those described above. As shown in FIGS. 10 and 11, for example, a closure 400 includes multiple male and female snaps 410, 415 extending from a resin base 405. The male and female snaps 410, 415 are substantially aligned with one another along the base 405. The male snaps 410 are longitudinally spaced apart about the base 405, and each of the male snaps 410 includes a v-shaped molded feature 420. The molded features extend transversely across a region of the base 405. The molded features 420 overhang the base 405 along opposite, longitudinal sides of the feature (e.g., outside of the male snap 410). The molded features 420, for example, can overhang the base 405 at an angle of about 50 degrees to about 85 degrees (e.g., about 60 degrees to about 75 degrees) relative to the base.

The female snaps 415 are arranged in a longitudinally repeating pattern along the base 405, and each of the female snaps 415 includes a pair of first opposing v-shaped molded features 455 and a pair of second opposing molded features 456. The first opposing molded features 455 are similar (e.g., identical) to the molded features 420. Consequently, the tooling costs can be substantially reduced in some cases. The second opposing molded features 456 extend along the spaces formed between adjacent features 456 to substantially enclose central regions 460 therebetween. The first molding features 455 provide overhanging portions on either side for adjacent female snaps. The second molding features 456 provide side walls that, as described below, help to prevent the male snaps 410 from sliding out of the central regions 460 of the female snaps.

The male and female portions of the closure 400 can be engaged with one another using methods similar to those discussed above. Referring to FIG. 11, for example, the snaps 410 can be aligned with the female snaps 415 and pressure can be applied to insert the male snaps 410 into the female snaps 415. For example, upon applying mating pressure to the male and/or female snaps, the male and/or female snaps can deflect. The overhanging portions of the molded features 420, for example, can deflect inwardly and the overhanging portions of the molded features 455 can deflect outwardly (e.g., away from the central region 460) to allow the male snaps 410 to be received within the female snaps 415. Due to the geometry of the overhanging portions of the male and molded features 420, 455, the male snaps 410 can be retained within the female snaps 415 in a direction normal to the base 405. Similarly, the molded features 456 can retain the male snaps 410 within the female snaps 415 in a transverse direction of the base 405. As with the embodiments discussed above, the male and female snaps 410, 415 can be disengaged from one another by pulling the male and female closure portions apart from one another, causing the overhanging portions of the male and/or molded features 420, 455 to deflect.

Other embodiments are within the claims.

What is claimed is:

1. A method of forming snap closures, the method comprising:
   introducing moldable resin into a gap defined adjacent a rotatable mold roll defining snap-forming cavities in its peripheral surface, each cavity defining an undercut;
   pressing some of the resin into the cavities to mold a series of discrete, spaced-apart male snaps, each male snap having at least one molded feature corresponding to at least one of the cavities in the mold roll, a remainder of the resin remaining on the peripheral surface of the mold roll and forming at least part of a longitudinal base from which the male snaps extend;
   molding of the resin a series of female snaps on the base, each female snap having a plurality of molded features defining a central region, and each female snap being aligned with one of the male snaps and sized to releasably retain its associated male snap when the associated male snap is disposed in the central region of the female snap;
   stripping the base and molded male snaps from the mold roll, the molded features of each male snap overhanging the base on multiple sides outside the male snap, and the molded features of each female snap overhanging the base on multiple sides within the female snap; and
   separating the base to form multiple snap closures, each closure including at least one male snap and at least one associated female snap.

2. The method of claim 1, wherein the snap-forming cavities are arranged in associated groups of at least three cavities forming a segmented ring, and each male snap has at least three molded features forming a segmented ring.

3. The method of claim 1, wherein each female snap has at least three molded features forming a segmented ring.

4. The method of claim 1, wherein each female snap comprises two opposed molded features.

5. The method of claim 4, wherein at least some of the opposed molded features partially form two adjacent female snaps.

6. The method of claim 4, wherein each female snap further comprises two additional opposed molded features, the molded features defining a substantially enclosed central region therebetween.

7. The method of claim 1, wherein at least some of the snap-forming cavities used to form the molding features of the male snaps are substantially identical to at least some cavities used to form the molding features of the female snaps.

8. The method of claim 1, wherein the female snaps are molded in associated cavities defined within the peripheral surface of the mold roll.

9. The method of claim 1, wherein the female snaps are molded in associated cavities defined within the peripheral surface of a counter-rotating pressure roll that, together with the mold roll, defines the gap into which the resin is introduced.

10. The method of claim 1, wherein the base, as molded, carries a longitudinal row of male snaps and a longitudinal row of corresponding female snaps, with a flexible web therebetween.

11. The method of claim 1, wherein each male snap essentially consists of three to five molded features together comprising between about 60 and about 80 percent of a circumference of their associated ring, such that breaks between the molded features togethercomprise between about 20 and about 40 percent of the circumference of their associated ring.

12. The method of claim 1, wherein each male snap essentially consists of four molded features, each molded feature extending between about 18 and about 36 degrees ofits associated ring.

13. The method of claim 1, wherein the longitudinal base is separated bysevering the base across its width.

14. The method of claim 1, wherein separating the base comprises separating afirst portion of the base from a second portion of the base, the first portion of the basecomprising at least one male snap and at least one female snap, and the second portion of the base comprising at least one male snap and at least one female snap.

15. The method of claim 14, wherein separating the first portion of the base fromthe second portion of the base comprises separating the base along a frangible region.

* * * * *

UNITED STATES PATENT AND TRADEMARK OFFICE
CERTIFICATE OF CORRECTION

PATENT NO. : 7,462,313 B2 Page 1 of 1
APPLICATION NO. : 11/248088
DATED : December 9, 2008
INVENTOR(S) : Christopher M. Gallant It is certified that error appears in the above-identified patent and that said Letters Patent is hereby corrected as shown below:

Title Page Page 1, column 2 (Primary Examiner), line 1:
delete "Monca" and replace with --Monica--.

Claim 11, column 12, line 40:
delete "togethercomprise" and replace with --together comprise--.

Claim 12, column 12, line 44:
delete "ofits" and replace with --of its--.

Claim 13, column 12, line 47:
delete "bysevering" and replace with --by severing--.

Claim 14, column 12, line 49:
delete "afirst" and replace with --a first--.

Claim 14, column 12, line 50:
delete "basecomprising" and replace with --base comprising--.

Claim 15, column 12, line 55:
delete "fromthe" and replace with --from the--.

Signed and Sealed this

Seventeenth Day of February, 2009

JOHN DOLL
*Acting Director of the United States Patent and Trademark Office*